United States Patent [19]

Borman

[11] 4,329,444

[45] May 11, 1982

[54] PRODUCTION OF POLYESTERS

[75] Inventor: Willem F. H. Borman, Pittsfield, Mass.

[73] Assignee: General Electric Company, Pittsfield, Mass.

[21] Appl. No.: 211,656

[22] Filed: Dec. 1, 1980

Related U.S. Application Data

[63] Continuation of Ser. No. 96,297, Nov. 21, 1979, abandoned, which is a continuation of Ser. No. 814,081, Jul. 8, 1977, abandoned, which is a continuation of Ser. No. 335,441, Feb. 26, 1973, abandoned.

[51] Int. Cl.$^3$ ............................................. C08G 63/18
[52] U.S. Cl. ................................. 528/272; 528/274; 528/279; 528/283; 528/309
[58] Field of Search ............... 528/272, 279, 283, 309, 528/274

[56] References Cited

U.S. PATENT DOCUMENTS

| | | | |
|---|---|---|---|
| 2,410,073 | 10/1946 | Howard | 528/303 |
| 2,993,029 | 7/1961 | Georgian et al. | 526/71 |
| 3,024,220 | 3/1962 | Cramer | 528/275 |
| 3,050,533 | 8/1962 | Munro et al. | 260/346.11 |
| 3,057,909 | 10/1962 | Sebelist et al. | 560/94 |
| 3,496,146 | 1/1970 | Mellichamp, Jr. | 528/309 |
| 3,551,386 | 1/1970 | Berkau et al. | 560/94 |
| 3,644,483 | 2/1972 | Griehl et al. | 560/94 |

FOREIGN PATENT DOCUMENTS

| | | |
|---|---|---|
| 545091 | 10/1959 | Belgium . |
| 2045914 | 3/1972 | Fed. Rep. of Germany . |
| 7105771 | 11/1971 | Netherlands . |

OTHER PUBLICATIONS

Bjorksten, "Polyesters" (Reinhold, N.Y.) 1956, pp. 40–41.
Chemical Week, Mar. 13, 1974, pp. 34 and 35.

*Primary Examiner*—Lucille M. Phynes
*Attorney, Agent, or Firm*—Hedman, Casella, Gibson & Costigan

[57] ABSTRACT

Poly(butylene terephthalates) are prepared by an improved process which makes it possible to directly esterify terephthalic acid and 1,4-butanediol without excessive loss of the diol reactant to side reactions. In the process, the conditions are controlled to promote rapid removal of the water as formed. It is also advantageous to minimize the contact time between 1,4-butanediol and terephthalic acid. Illustratively, 1,4-butanediol will be heated to 175°–275° C., terephthalic acid is gradually added, and byproduct water is removed as formed. In another embodiment, a mixture of terephthalic acid and an excess of 1,4-butanediol is heated and byproduct water is removed by entrainment in the excess 1,4-butanediol distilled from the reaction zone.

15 Claims, No Drawings

PRODUCTION OF POLYESTERS

CROSS-REFERENCE TO RELATED APPLICATIONS

This is a continuation of Ser. No. 96,297, filed Nov. 21, 1979, which is a continuation of Ser. No. 814,081, filed July 8, 1977, which, in turn, is a continuation of Ser. No. 335,441, filed Feb. 26, 1973, all of which are abandoned.

This invention relates to the preparation of polymeric butylene glycol esters of terephthalic acid. More particularly, there is provided an improved direct esterification process to make such polyesters from terephthalic acid and 1,4-butanediol, with almost total suppression of side reactions causing the loss of the diol reactant.

BACKGROUND OF THE INVENTION

High molecular weight linear polyester resins of the poly(1,4-butylene terephthalate) family are known to be uniquely superior as components in thermoplastic molding compositions, because of their excellent physical properties and surface appearance after molding. In comparison with lower homologous polyesters, such as poly(ethylene terephthalate) and poly(1,3-propylene terephthalate), the poly(1,4-butylene terephthalate) resins crystallize very rapidly from the melt and therefore they can be formulated into compositions which are moldable in conventional equipment with conventional temperature and cycle times, and without the need to use nucleating agents.

Methods for the preparation of poly(alkylene terephthalates) by direct esterification of terephthalic acid (TPA) with the corresponding alkylene glycols are well known.

Most known methods employ high temperatures and superatmospheric pressure conditions to promote solubilization and reaction of the intractable TPA.

When these known conditions are applied to the preparation of poly(1,4-butylene terephthalate) (PBT) resins, excessive amounts of 1,4-butanediol are required due to dehydration of part of the butanediol to tetrahydrofuran. This side reaction makes the known direct esterification methods economically unattractive for the preparation of PBT. For example, according to a recently published method (Netherlands Pat. No. 7105777 (1971)), the butanediol usage was 376% over the theoretical amount required.

It has now been discovered that the side reaction, causing the use of such excessive amounts of 1,4-butanediol, can be almost totally suppressed if reaction conditions are selected which promote the rapid removal from the reaction zone of byproduct water (formed in the esterification reaction), and which minimize the time spent by the 1,4-butanediol in contact with unreacted TPA.

The following significant parameters are to be controlled:

A. To promote rapid removal of water formed:
1. A reaction temperature in the range of from about 175° to about 275° C.
2. Atmospheric or subatmospheric pressure immediately from the start of the reaction.
3. Presence of a high boiling solvent, e.g., tetralin, decalin, and the like, or preferably excess 1,4-butanediol, to entrain and help drive off water.
4. Gradual addition of the TPA to the hot 1,4-butanediol, facilitating the rapid removal of water as formed.

B. To minimize contact between 1,4-butanediol and TPA:
1. Use of an efficient catalyst, such as an antimony compound, and the like, but preferably a titanium compound or a tin compound to shorten the reaction time.
2. Gradual addition of TPA and a high reaction temperature as mentioned under A.

The poly(1,4-butylene terephthalate) resins can be obtained in very economical fashion by the present improved process. Moreover, the products may be just as easily compounded and will ultimately provide molded articles with substantially the same superior properties as those made from the best of the prior art polyesters.

DESCRIPTION OF THE INVENTION

According to the present invention, there is provided a process for the preparation of high molecular weight, linear poly(1,4-butylene terephthalate), the process comprising:
(a) heating 1,4-butanediol to a temperature in the range of from about 175° to about 275° C.;
(b) gradually adding terephthalic acid to the hot 1,4-butanediol; and
(c) removing the byproduct water from the reaction mixture as the water is formed.

In another aspect, there is provided a process for the preparation of a high molecular weight, linear poly(1,4-butylene terephthalate), the process comprising:
(a) heating a mixture of terephthalic acid and at least 1.25 moles of 1,4-butanediol per mole of the acid at a temperature in the range of from about 175° to about 275° C. at atmospheric or subatmospheric pressure;
(b) distilling the excess 1,4-butanediol from the reaction mixture; and
(c) removing the byproduct water by entrainment in excess 1,4-butanediol distilled from the mixture.

A preferred feature of the invention will include carrying out the reaction steps at atmospheric or subatmospheric pressure, e.g., as can be reached by aspirators and pumps. In a preferred feature, the 1,4-butanediol will be present at a molar ratio of at least 1.25, but preferably 2:1, based on the acid. Greater excesses can be used, although there is not much to be gained by exceeding a ratio of about 100:1.

Still another preferred feature is to carry out the process with a high boiling liquid medium, e.g., decalin, tetralin or the like, but preferably excess 1,4-butanediol, to assist in driving off the byproduct water.

Still other preferred features are to include polyesterification catalysts in the reaction mixture to shorten the time of contact between unreacted 1,4-butanediol and terephthalic acid. Any conventional catalyst, e.g., an inorganic or organic titanium, tin, or antimony compound can be used, and in conventional amounts. For example, 0.001 to 1.0 mole % of tetrabutyl titanate, tetra octyl titanate, or triethanolamine titanate, antimony oxide, dibutyl tin-maleate, -dilaurate, and the like can be added. Preferably, the polyesterification catalyst will be an organo-titanium or an organo-tin compound.

The high molecular weight, linear poly(1,4butylene terephthalate) resins produced by the improved process of this invention can include small amounts, e.g, of up to about 15 mol. % of groups derived from other glycols, such as ethylene glycol, 1,3-propanediol, 1,4-dimethylol cyclohexane, and the like, and other diacids, e.g., isophthalic acid, succinic acid, naphthalene dicarboxylic acid, and the like.

The molecular weight in the final product will be sufficiently high to provide an intrinsic viscosity of from about 0.7 to about 2.0 deciliters per gram, measured, for example, as a solution in a 60:40 mixture of phenol and tetrachloroethane at 30° C.

These high molecular weights are attainable in only about 4 hours under the conditions of the present invention.

With respect to the process steps and reagents, in one manner of proceeding, three moles of commercially available 1,4-butanediol can be heated in a suitably sized reactor provided with a short fractionation column and heated, e.g., with an external oil bath at, e.g., 250° C. The 1,4-butanediol is stirred and purged with a nitrogen stream until it is boiling rapidly, then one mole of commercially available terephthalic acid is added gradually, e.g., during the ½ hour. Preferably, about 0.1 mole % of tetrabutyl titanate is also present in the hot reaction mixture. After the acid addition is complete, the temperature is increased, e.g., to about 260° C., and the pressure is gradually decreased, e.g., to about 0.5 mm Hg during, for example, 2–3 hours. The distillates are collected and comprise 1,4-butanediol and water. The resinous product is recovered from the reaction vessel by conventional methods.

In another manner of proceeding, terephthalic acid and about 5 moles of 1,4-butanediol per mole of terephthalic acid are charged to a suitably sized reactor. Preferably, 0.1 mole % of tetrabutyl titanate or similar catalyst (based on the acid) is added. The reaction mixture is heated, for example to 185°–205° C. until it becomes clear, e.g., in 1.5 to 3 hours, then a mild vacuum (e.g., 28" Hg) is applied for a time sufficient to remove the excess 1,4-butanediol (and entrained water)—usually about 0.5 to 1.5 hours is adequate. Finally, the prepolymer is heated at, e.g., 225°–255° C. under a higher vacuum, e.g., 0.1–1.0 mm Hg, until the desired degree of polymerization is obtained, e.g., for about 1 hour. The resinous product is removed from the reactor by conventional methods.

DESCRIPTION OF THE PREFERRED EMBODIMENTS

The following examples illustrate the preparation of polyester resins according to the novel process of the present invention. For comparison purposes, several procedures are set forth to demonstrate the improvements obtained by proceeding in the specified manner. The examples are not to be construed to limit the invention in anyway whatsoever.

EXAMPLE 1

1,4-butanediol, 135 g., 1.50 moles and 0.15 g of tetrabutyl titanate, $0.44 \times 10^{-3}$ moles, are placed in a 300 ml. reactor provided with a short fractionation column and submerged in an oil bath kept at 250° C. The mixture is mechanically stirred and purged with a nitrogen stream at 25 cc./min. Terephthalic acid, 83.3 g., 0.50 moles, is added gradually during ½ hours to the hot reaction mixture. After the mixture becomes clear, the temperature is increased to 257° C. and the pressure is gradually reduced to 0.5 mm Hg over the next 2 hours and 20 minutes. The distillates are collected and analyzed and 0.821 moles of 1,4-butanediol is recovered. The calculated usage of 1,4-butanediol is $(1.50 - 0.821)/0.50 = 1.358$ moles diol/mole TPA. This is an excess of 35.8% over theory. The recovered polymer has an intrinsic viscosity of 1.74 dl./g. (at 30° C. in a mixture of 60:40 phenol-tetrachloroethane).

Comparative Procedure A.

As in Example 1, 135 g. of 1,4-butanediol, 83.3 g. of terephthalic acid and 0.15 g. of tetrabutyl titanate are reacted. However, the terephthalic acid is present from the start and is not added gradually. The distillates contain 0.687 mole of 1,4-butanediol, so that the diol usage is $(1.50 - 0.687)/0.50 = 1.63$ moles diol/mole TPA. This is a 63% excess over the theoretically required amount. The recovered polymer is off-white and has an intrinsic viscosity of 1.50 dl./g.

EXAMPLE 2

Terephthalic acid, 33.2 lbs. (0.2 lb. mole), 85 lbs. 0.944 lb. mole) of 1,4-butanediol and 28 g., $0.181 \times 10^{-3}$ lb. mole, of tetrabutyl titanate are charged to a 20 gallon stainless steel reactor. The mixture is heated for 2 hours and 20 minutes at 185°–202° C., until it became clear, then ⅔ hour under a mild vacuum (down to 28" Hg) to remove the excess diol and entrained water. The prepolymer is transferred to a polymerization reactor and treated for 1 hour at 225°—225° C. and a pressure down to 0.38 mm Hg. The distillates are analyzed and found to contain a total of 0.725 lb. moles of butanediol. The diol usage in this reaction is therefore $(0.944 - 0.725)/0.2 = 1.095$ moles diol/mole TPA or only 9.5% over the theoretically required amount. The polymer is recovered and has an intrinsic viscosity of 1.13 dl./g.

Comparative Procedure B.

According to the recently published method of Netherlands Patent 7105777 (1971), based on U.S. Ser. No. 32,754 (1970), 125 g. of terephthalic acid, 0.75 mole, 375 g. of 1,4-butanediol, 4.167 moles, and 0.225 g. of tetrabutyl titanate, $0.66 \times 10^{-3}$ mole, are reacted in a stainless steel autoclave for 3 hours at 235° C. and a pressure of 50–70 psig. The prepolymer then is further polymerized in a glass reactor for 2 ½ hours at 250° C. and a final vacuum of 0.3 mm Hg. The collected distillates are analyzed and contain a total of 0.596 moles of 1,4-butanediol. Thus, by this method, the butanediol usage is $(4.167 - 0.596)/0.75 = 4.76$ moles diol/mole TPA or 376% over the theoretical amount required. The polymer is recovered and has an intrinsic viscosity of 1.02 dl./g.

EXAMPLE 3

In a 100 cc tube shaped reactor, provided with a spiral shaped stirrer and a sidearm for removal of volatile products, are placed: 16.6 g terephthalic acid (0.10 moles), 13.5 g 1,4-butanediol (0.15 moles) and 0.02 g triethanolamine titanate ($3.5 \times 10^{-5}$ moles). After purging with nitrogen, the tube is immersed in an oil bath heated to 240° C. for 105 minutes, when the reaction mixture becomes clear. The temperature is then increased to 255° C. and the pressure gradually reduced to 0.15 mm Hg over the following two-hour period. The resulting product has an intrinsic viscosity of 1.05 dl/g. Analysis of the distillates indicates that a total of 0.019 moles of butanediol has been recovered; consequently the butanediol consumption is $(0.15 - 0.019)/0.1 = 1.31$ moles diol/mole TPA, or 31% in excess of the theoretical requirement.

In this example the excess of butanediol charged initially is only 50%; however, the use of an effective catalyst and the effective entrainment of water by the excess butanediol in the absence of a fractioning column still makes it possible to obtain a product of high molecular weight with a relatively low loss in butanediol.

EXAMPLE 4

The experiment of proceeding Example 3 is repeated except that: the catalyst consists of 0.1 g dibutyl tin dilaurate ($1.6 \times 10^{-4}$ moles) and the total reaction time is 195 minutes. The resulting polymer has an intrinsic viscosity of 0.99 dl/g; the amount of butanediol found in the distillates is 0.0129 moles; and the effective butanediol usage is therefore $(0.15-0.0129)/0.10=1.371$ moles diol/mole TPA, or 37.1% in excess of the theoretical requirement.

EXAMPLE 5

The procedure of the above examples is repeated, except that the catalyst consists of 0.1 g dibutyl tin maleate ($3.2 \times 10^{-4}$ moles) and only 11.7 g butanediol (0.13 moles) is charged to the reactor. After a reaction time of 2-½ hours a polymer is obtained with an intrinsic viscosity of 0.73 dl/g. The diol usage, corrected for 0.0036 moles of butanediol found in the distillates, is $(0.31-0.0036)/0.10 = 1.264$ moles butanediol/mole TPA, or 26.4% in excess of the theoretical requirement.

The above examples demonstrate that high molecular weight poly(1,4-butylene terephthalates) are obtained with very much reduced and almost total suppression of the amount of 1,4-butanediol lost to side reactions, e.g., dehydration of part of the 1,4-butanediol to tetrahydrofuran.

Other modifications of Examples 1–5 provide processes within the scope of this invention.

For example, for terephthalic acid, substitute a 98/2 mixture of terephthalic acid and isophthalic acid; a 99/1 mixture of terephthalic and adipic acids; or for the 1,4-butanediol substitute a 98/2 mixture of 1,4-butanediol and glycerine.

For dibutyl tin maleate, substitute stannous oxalate.

Because of their excellent physical, mechanical, chemical, electrical and thermal properties, the polyesters produced by the process of this invention have many and varied uses. They may be used alone as molding powders or mixed with other polymers and may contain fillers, both reinforcing, such as glass filaments, and non-reinforcing, such as wood flour, cloth fibers, clays and the like, as well as flame retardants, pigments, dyes, stabilizers, plasticizers, etc.

Obviously, other modifications and variations of the present invention are possible in the light of the above teachings. It is therefore to be understood that changes may be made in the particular embodiments of the invention described which are within the full intended scope of the invention as defined by the appended claims.

I claim:

1. A process for the preparation of a high molecular weight, linear poly(1,4-butylene terephthalate) resin, said process comprising:
    (a) heating 1,4-butanediol to a temperature in the range of from about 175° to about 275° C.;
    (b) gradually adding terephthalic acid to the hot 1,4-butanediol; an
    (c) removing the byproduct water from the reaction mixture as the water is formed.

2. A process as defined in claim 1 wherein steps (a)–(c) are carried out at atmospheric or subatmospheric pressure.

3. A process as defined in claim 1 wherein a high boiling liquid medium is present in the reaction mixture to assist in driving off the water.

4. A process as defined in claim 3 wherein the high boiling liquid medium is an excess of 1,4-butanediol.

5. A process as defined in claim 1 wherein the reaction mixture also includes a polyesterification catalyst.

6. A process as defined in claim 5 wherein the polyesterification catalyst is an organo-titanium or an organo-tin compound.

7. A process as defined in claim 6 wherein said catalyst is tetrabutyl titanate.

8. A process for the preparation of a high molecular weight, linear poly(1,4-butylene terephthalate), said process comprising:
    (a) heating a mixture of terephthalic acid and at least 1.25 moles of 1,4-butanediol per mole of said acid at a temperature of in the range from about 175° to about 275° C. at atmospheric or subatmospheric pressure;
    (b) distilling the excess 1,4-butanediol from the reaction mixture; and
    (c) removing the byproduct water by entrainment in excess 1,4-butanediol distilled from the mixture.

9. A process as defined in claim 8 wherein the mixture comprises from about 2 to about 100 moles of 1,4-butanediol per mole of terephthalic acid.

10. A process as defined in claim 8 wherein the reaction mixture also includes a polyesterification catalyst.

11. A process as defined in claim 10 wherein the polyesterification catalyst is an organo-titanium or an organo-tin compound.

12. A process as defined in claim 11 wherein said catalyst is tetrabutyl titanate.

13. A process as defined in claim 11 wherein said catalyst is triethanolamine titanate.

14. A process as defined in claim 11 wherein said catalyst is dibutyl tin laurate.

15. A process as defined in claim 11 wherein said catalyst is dibutyl tin maleate.

* * * * *

UNITED STATES PATENT AND TRADEMARK OFFICE
CERTIFICATE OF CORRECTION

PATENT NO. : 4,329,444
DATED : May 11, 1982
INVENTOR(S) : Willem F. W. Borman

It is certified that error appears in the above—identified patent and that said Letters Patent is hereby corrected as shown below:

At column 4, line 28, "225°-225°C" should be --225°-255°C--.

At column 6, line 10, "an" should be --and--.

Signed and Sealed this

Seventeenth Day of July 1984

[SEAL]

Attest:

GERALD J. MOSSINGHOFF

Attesting Officer  Commissioner of Patents and Trademarks